April 5, 1960  J. R. JOHNSON  2,931,601
SHOCK ABSORBING ENGINE MOUNT
Filed Aug. 1, 1957  4 Sheets-Sheet 1

INVENTOR.
JAMES R. JOHNSON
BY
Charles F. Dieckler
ATTORNEY

April 5, 1960     J. R. JOHNSON     2,931,601
SHOCK ABSORBING ENGINE MOUNT
Filed Aug. 1, 1957     4 Sheets-Sheet 2

INVENTOR.
JAMES R. JOHNSON
BY
Charles F. Dischler
ATTORNEY

April 5, 1960   J. R. JOHNSON   2,931,601
SHOCK ABSORBING ENGINE MOUNT

Filed Aug. 1, 1957   4 Sheets-Sheet 3

INVENTOR.
JAMES R. JOHNSON
BY
Charles F. Dischler
ATTORNEY

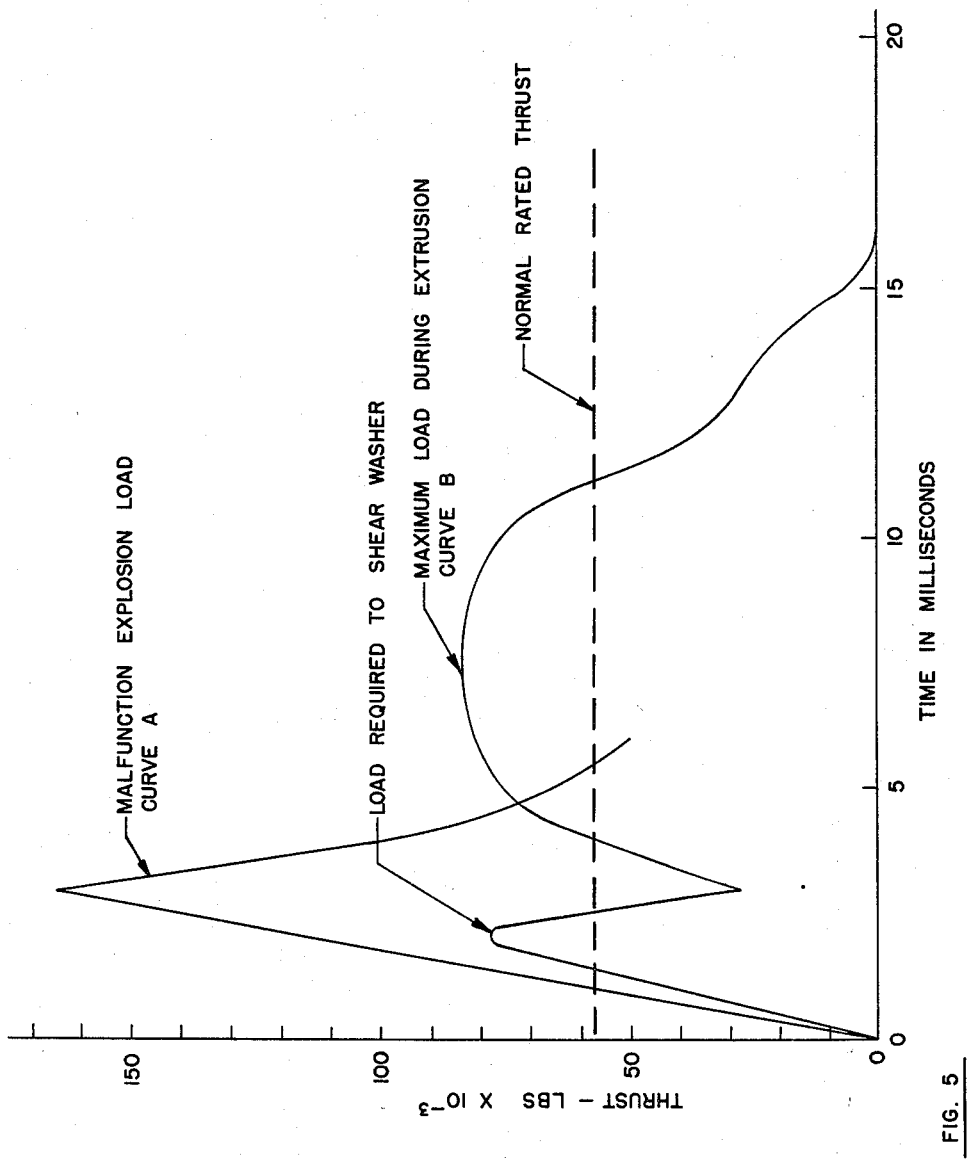

United States Patent Office 2,931,601
Patented Apr. 5, 1960

2,931,601

SHOCK ABSORBING ENGINE MOUNT

James R. Johnson, Los Angeles, Calif., assignor to North American Aviation, Inc.

Application August 1, 1957, Serial No. 675,702

8 Claims. (Cl. 248—5)

This application relates to a thrust engine mounting and in particular it relates to a shock absorbing mount to moderate the peak loading that may be developed as the result of a starting explosion in a combustion engine, and in particular in a combustion engine of the axial-thrust type such as a rocket engine.

High energy thrust engines of the rocket type are presently utilized in missiles and high altitude research aircraft and will undoubtedly find increasing usage in future aerial vehicle applications. Starting malfunctions in such a rocket engine may produce an explosion in the combustion chamber. This results in a short duration load, lasting for as little as approximately three milliseconds, the magnitude of which may be three times or more the normal rated thrust of the engine. In presently contemplated installations, this may mean peak loads of many hundreds of thousands of pounds of thrust that will be exerted on the aircraft structure if the force is not otherwise moderated or absorbed.

Where weight is not a primary consideration it is feasible to design the engine support structure to withstand this short duration peak loading effect. However, in the design of missiles and aircraft, such a massive over-designed structure would introduce an intolerable weight penalty into the structure. In a typical research vehicle installation, designing to the peak load produces an estimated weight increase of approximately forty pounds over the weight of the support structure normally required for rated thrust.

To overcome the above-stated objection, the present invention provides a shock absorbing mount that operates upon the principle of impact extrusion. In this device the normal rated engine thrust and any overload up to a certain predetermined limit is transmitted directly to the support structure by a normally rigid, fixed, engine mounting means. Upon exceeding this value of thrust the additional impact load is caused to be applied to a member that is plastically yieldable at high pressures to extrude the same in a manner such that the engine mounting means is non-returnably held at its furthermost position of movement.

Accordingly, it is an object of this invention to provide a thrust engine mount that will withstand peak loads caused by a combustion chamber explosion without requiring an appreciable increase in the size or strength of the engine support structure.

It is another object of this invention to provide a shock absorbing engine mount that will moderate the peak loading caused by a malfunction or starting explosion in an attached thrust engine.

It is also an object of this invention to provide an impact energy absorption mount for a thrust engine, such as a rocket engine, that operates on the principle of extrusion of a plastically yieldable material to provide energy absorption and which is arranged to securely hold the engine against movement after extrusion of the yieldable material.

It is still another object of this invention to provide an impact energy absorption mount for a thrust engine, such as a rocket engine, that operates on the principle of extrusion of a metal element to provide energy absorption and which provides means for preloading of the mount in a manner to permit rigidly securing said engine to the mount without the application of any load to the extrusion element within the limits of a predetermined normal loading range.

A still further object of this invention is to provide a simple, inexpensive, non-reusable mount for the absorption of the impact energy resulting from an explosive application of force.

These and other objects and advantages of the present invention will become apparent to those skilled in the art after reading the present specification and the accompanying drawings forming a part thereof, in which.

Figure 4:
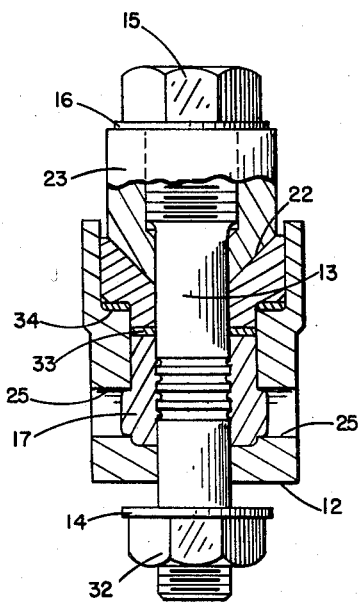

Fig. 4 is a fragmentary sectional view of the shock absorption device showing the metallic element extruded in a manner to provide a rigid grip or stop for the rocket engine; and Fig. 5 is a graph of thrust versus time and shows a curve for the peak load resulting from a malfunction explosion as well as the force-time curve for the device of this invention illustrating the reduction in force that can be achieved by reacting the explosive force over a longer period of time.

Figure 1:
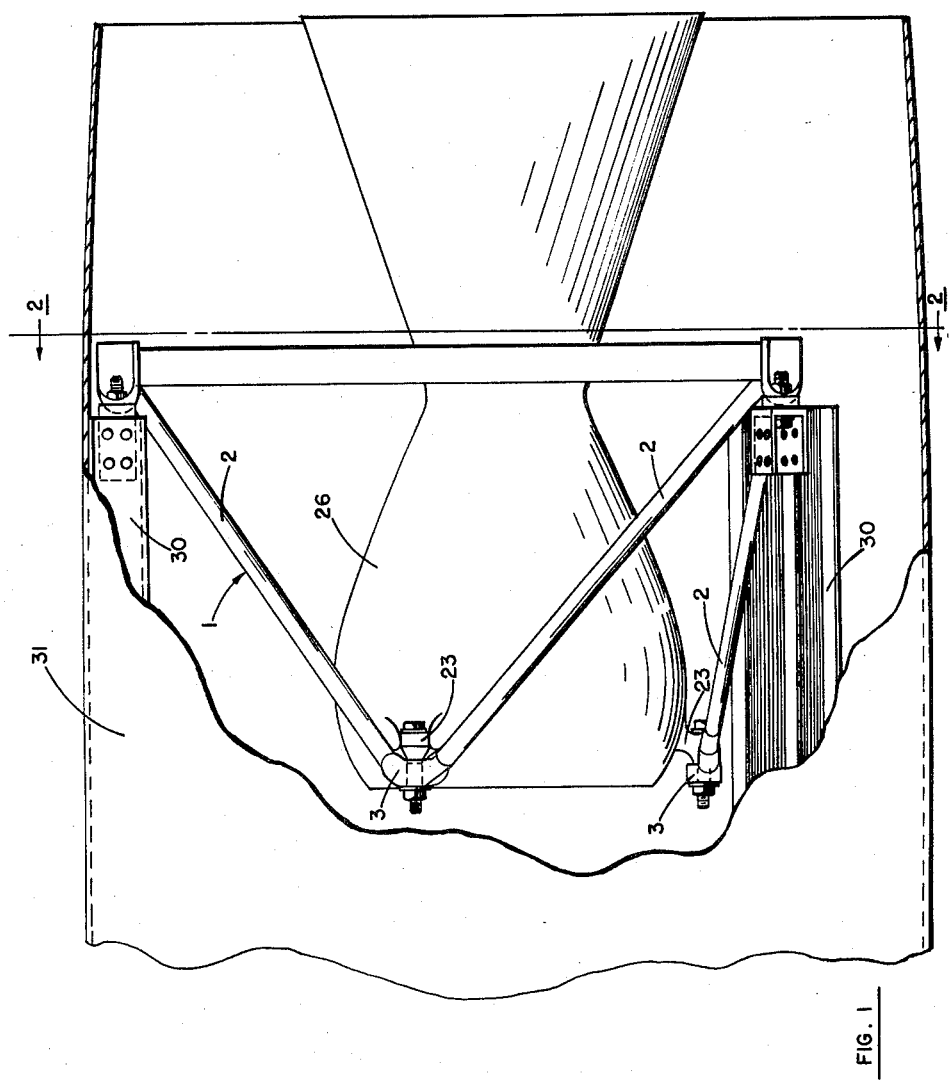
Fig. 1 is a fragmentary, partially cut-away view of an aerial vehicle showing a rocket engine in elevation supported from a truss mounting structure incorporating the impact energy absorption device of this invention.

Referring specifically to the drawings where like reference characters have been used throughout the several views to designate like parts and referring at first to Fig. 1, reference numeral 1 generally designates an engine mount supporting a thrust engine 26 from longitudinal stringers 30 in an aerial vehicle 31. While it will be understood that the mount of this invention is equally applicable to any type of structure having the problem of a possible explosive or impact type overload the invention is applied and described herein as being utilized for mounting a rocket engine.

Figure 2:
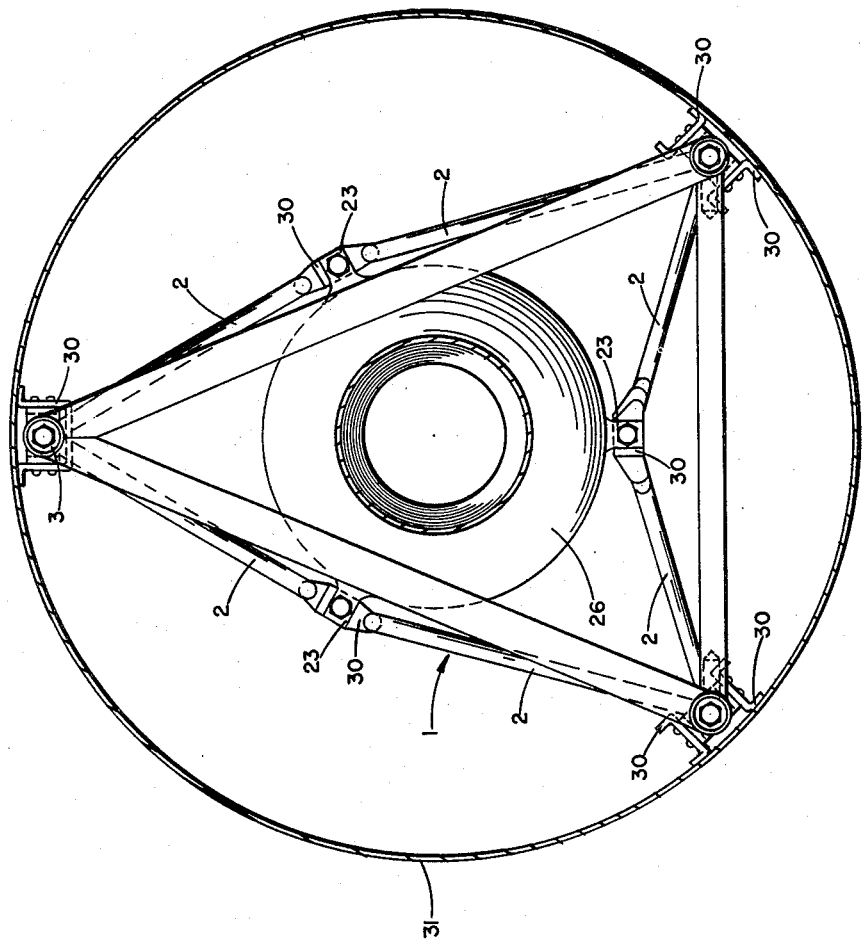
Fig. 2 is a sectional view taken in the plane of line 2—2 in Fig. 1 looking forward and showing the supporting structure in end elevation.

As best shown in Figs. 1 and 2, the engine mount comprises a truss-like structure having a series of mounting points for supporting the engine. As shown herein, the rocket engine 26 is supported at three mounting points. The shock mount device 3 of this invention is located at these three points and serves to connect the tubular truss members 2 together. Each shock mount device thus takes one-third of the total thrust load. It will be obvious to those skilled in the art that the specific truss structure is capable of infinite variations and that more or less than three shock mounting devices may be utilized.

Figure 3:
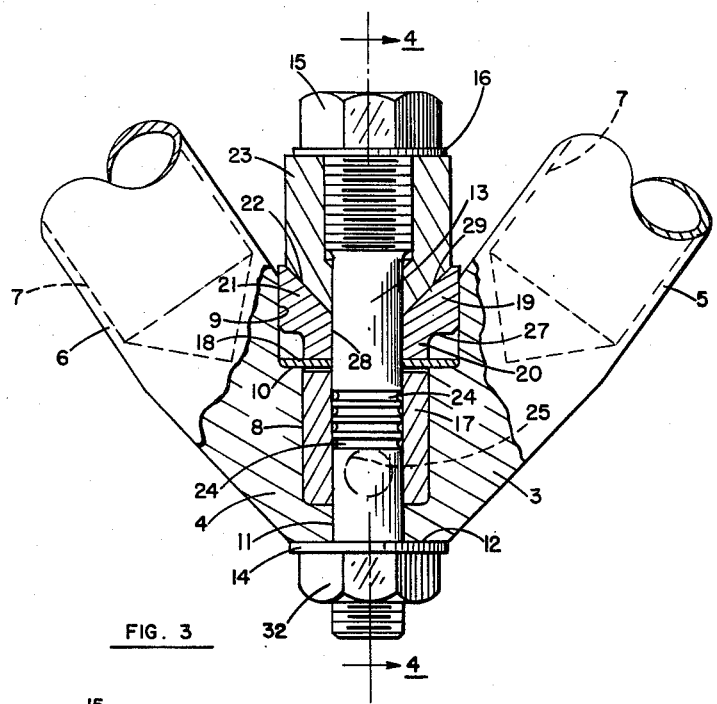
Fig. 3 is a view partly in section and partly in elevation showing the energy absorption device of this invention in its normal operating position with the metal element in an unextruded state.

As best shown in Fig. 3, the shock mount 3 comprises a body member 4 having leg portions 5 and 6 extending angularly outwardly therefrom. These leg portions contain sockets 7 for the reception of the truss bars or tubes 2, which are suitably attached to body member 4 by welding, brazing, or the like, in a manner to form an integral structure. At a location in body member 4 midway between the angulated leg portions 5 and 6 a chamber 8 is formed therein. This chamber has its longitudinal axis parallel to the longitudinal axis of the engine whereby the engine thrust load may be transmitted to the supporting structure without the introduction of torque loads into the truss. A counterbore 9 is formed at the upper end of chamber 8 thereby forming a shoulder 10 intermediate the ends of chamber 8. A bore 11 extends axially from the bottom of the chamber 8 to flat 12 on the exterior of the member 4. This bore 11 is for the reception of the engine attachment bolt 13. Nearer the lower end or bottom of chamber 8 radial extrusion passageways 25 extend from the chamber. These passageways provide chambers into which the material of the extrusion member or plug 17 will flow plastically when the yield point of the material is exceeded.

As shown in Fig. 3, the extrusion plug 17 substantially fills the lower portion of chamber 8 with its top just slightly beneath the level of the shoulder 10. An apertured shear plate or washer 18 is dimensioned to snugly rest on shoulder 10 and support a piston 19 and an engine mount lug 23 attached thereon by bolt 13. The proportional part of the full thrust force of the engine taken by each mount is transmitted to body member 4 and engine thrust mount 1 by means of the shear washer 18. The shear washer is predeterminately dimensioned and selected of a material to preferably rupture at approximately 137% of the engine rated thrust or any equivalent safe overload value and may be of any material such as steel, that is sufficient to withstand the preloading forces caused by attachment of the engine to the mount. The shear washer allows the engine attachment bolts 13 to be preloaded without affecting the extrusion slug. The transmittal of the normal rated thrust of the engine to the body member 4 and thence to the engine truss support structure 1 in this manner prevents the application of the normal rated engine thrust being applied to the extrusion plug 17. This is of great importance due to the tendency of many extrudable materials, that could be used to form such plug, to creep under such normal applied loading thereby causing loosening of the thrust engine during its normal operation.

The piston 19 has a small diameter portion 20 at the bottom end thereof which rests on the shear plate 18. Piston portion 20 has the same diameter as chamber 8 and is slidable therein when not restrained by shear washer 18. The upper portion of the piston consists of a larger diameter portion 21 which slidably engages the walls of counterbore 9. The annular piston shoulder 27 formed on the dual diameter piston thus forms a positive stop when in contact with shoulder 10 of mount body 4 to limit downward movement of piston 19, attached engine mounting lug 23 and the engine proper. The piston is centrally apertured at 28 to provide for passage of attaching bolt 13. The upper surface of piston 19 contains a concentric frusto-conical depression 22. Engine mounting lug 23 has a complementary frusto-conical portion 29 formed on its lower portion adapted to be received within piston depression 22.

The engine proper is thus attached to the support structure by means of mounting lug 23 which is integral with the engine or rigidly attached thereto. Attaching bolt 13 is dimensioned to draw mounting lug 23 tightly down onto the piston 19 with the frusto-conical portion 29 matching the frusto-conical groove 22 in the piston top. The engine attaching bolt is drawn down and rigidly secured in a manner to preload the support structure by means of washer 14 and nut 32 at one end and washer 16 and nut 15 at the other end. In the region where attaching bolt 13 passes through the extrusion slug 17 circumferential grooves or corrugations 24 are formed on the surface of the bolt. These grooves together with extrusion ports 25 form the means for locking the shock mount assembly and attached engine in its new position after extrusion of plug 17 under the action of an engine explosion with resultant displacement of the engine.

Other arrangements for locking the engine in its final position following an explosion, with consequent deformation and extrusion of the plug member, are feasible without departing from the scope or concept of this invention.

The important requirement is that means be provided to allow the material of the extruded plug to securely grip and hold both the attachment bolt and the shock mount body member. This will effectively secure the engine and the supporting truss structure together after such an explosion and prevent vibration and stress that might otherwise result if the engine had any freedom of movement. For example, the wall of chamber 8 may be corrugated or grooved to provide a region into which the extrudable material would be forced thereby providing a locking or keying action between the plug 17 and body member 4. Similarly, bolt 13 could have one or more cavities or apertures therein into which the plug material could be extruded to lock the bolt to plug 17, or any combination of such means could be utilized as dictated by design requirements.

In operation, if the engine imposes an impact load greater than the predetermined design limit for rupture of disc 18, it will shear this disc into two annular portions 33 and 34. (See Fig. 4) The piston member 19 is then free to act downwardly against the relatively soft plug 17. When the yield point of the plug material is exceeded under the force exerted by the piston it will extrude into passageways 25. At the same time the plug material will be forced into grooves 24. Shoulder 27 on the piston member limits the downward travel of this portion of the mount. The energy of the shock load is absorbed in extruding the plug thereby dissipating the shock load and preventing damage to the fuselage structure. The material which extrudes into the grooves 24 in the bolt 13 and into passageways 25 in body member 4 locks the assembly in the position it assumes as the result of the displacement caused by the impact load. Thus, the engine is held tightly after the impact load despite the fact that downward movement of the bolt will move nut 30 away from the fixed structure. The shock mounted after explosion is shown to advantage in Fig. 4.

In the preferred embodiment the device of this invention utilizes an extrusion slug formed of 2S-0 aluminum (Federal specification QQ-A-561), a steel piston, and a steel shear washer. However, it will be appreciated that this invention is not limited to the preferred choice of materials set forth herein. In addition to 2S-0 aluminum, non-limiting examples of metals suitable for forming the extrustion plug include such materials as lead, magnesium, copper and the like, as well as alloys thereof, and also aluminum alloys other than the 2S-0 type. The choice of materials for practicing this invention is well within the knowledge and ability of one skilled in the art. Insofar as the design of the plug of extrudable material is concerned it is a function of the thrust force to be absorbed, the extrusion pressure characteristics of the particular material selected, the physical dimensions of the extrusion plug and extrusion passageways, and the method of force application to the extrusion plug.

Since the engine mounting truss 1 has to take the normal thrust loads, it is only the energy under that part of the explosion-time curve as shown on the graph of Fig. 5, that exceeds the normal rated thrust plus an allowable overload that creates the problem. The area bounded by the explosion force-time curve and the normal thrust rating curve, to which an allowable overload has been added, represents the impulse that must be modified. For an engine weight of 700 pounds, the kinetic energy that a typical thrust engine of the rocket type may have after the explosion, if it is not restrained, would be in the neighborhood of 12,700 inch pounds. Since the extrusion pressure for 2S-0 aluminum is practically a constant for a certain configuration, and assuming that the extrusion energy must equal the kinetic energy, then only the cross sectional area and length of extrusion must be modified to produce the optimum proportions of the slugs.

From curve B of Fig. 5, it will be seen that with proper design, the impact extrusion process is accomplished at a nearly constant load level. It is this feature that can change the explosion impulse from a large load acting over a very short time (curve A) to a small load acting over a longer period of time (curve B). Extrusion curve B, which graphically illustrates the operation of the device of this invention, shows two peak loads, each of which is less than the single, short-duration peak load of the non-absorbed explosion load curve A. The maximum value of the first peak of curve B represents the force acting on the shear washer just prior to rupture of the washer. After the washer is sheared the load drops abruptly as the piston traverses the distance between the top of the extrusion plug and the bottom of the shear washer. Upon contact of the combined piston and sheared washer portion 33 with the extrusion plug the load increases to an approximately constant value that is substantially the same value, for the 2S-0 aluminum material, as that required to shear the washer. It will be seen from the curve that this load acts for a period of approximately 5 to 8 milliseconds.

Since an explosion load is a malfunction and would ruin the engine for further use, it will be understood that the shock mount is a simple, economical, non-returnable type of energy absorption mechanism that provides the optimum means of protecting the supporting structure for an engine or other impact energy producing device from such an explosive load.

While a particular embodiment of this invention has been illustrated and described herein, it will be apparent that various changes and modifications may be made in the construction and arrangement of the various parts without departing from the spirit and scope of this invention in its broader aspects or as defined in the following claims.

I claim:

1. An impact energy absorption mounting for a combustion engine for absorbing the excess force of an uncontrolled combustion chamber explosion comprising an engine support structure, a yieldable means adapted for absorption of impact energy mounted on said support structure, a piston means mounted on said support structure for transferring the engine thrust force to said support structure during normal engine operation, force applying means operatively contacting the engine and said piston means for securely holding said engine in operative contact with said piston means during normal engine thrust operation, frangible means separating said piston means and said yieldable means for permitting said piston means to apply force to said yieldable means upon occurrence of an uncontrolled combustion chamber explosion and rupture of said frangible means, and means in juxtaposition to said yieldable means for securely holding said yieldable means and said engine at their limits of travel after yielding of said yieldable energy absorption means.

2. An impact energy absorption mounting as in claim 1 wherein said means for securely holding said yieldable means comprises extrusion ports in said support structure and said yieldable means comprises a member extrudable through said ports.

3. An impact energy absorption mounting as in claim 2 wherein said yieldable means comprises an aluminum alloy element.

4. An impact energy absorption mounting member for an axial thrust engine comprising a body member adapted to be attached to the thrust engine and to suitable adjacent supporting structure and having a longitudinally extending chamber therein, said chamber having laterally extending extrusion passageways near one end and a shoulder portion intermediate both ends, an extrudable member in said chamber in juxtaposition to said extrusion passageway, a shear washer positioned to bear on said shoulder and not normally contacting said extrudable member, a piston member adapted to slide in said chamber and having a shoulder portion adapted to contact said chamber shoulder to stop movement of said piston beyond a predetermined limit, said piston normally being in contact with and supported on one end by said shear washer, an engine mounting lug operatively contacting the other end of said piston, and bolt means attaching said engine mounting lug to said piston member.

5. An impact energy absorption mounting member as in claim 4 wherein said extrudable member is of a metal softer than said piston.

6. An impact energy absorption mounting member as in claim 5 wherein said bolt means passes through said extrudable member and has a grooved peripheral surface portion whereby a portion of said extrudable member may be deformed into said grooves to lock said bolt means to the extrudable member upon deformation thereof.

7. A shock absorber mount for a high thrust engine having attachment portions comprising an engine support structure having members adapted for attachment to the engine attachment portions to rigidly secure the engine to said support structure under normal thrust loads but adapted to plastically yield under a predetermined excessive thrust load, each of said members having a duality of adjacent coaxial chambers therein, a frangible member separating said chambers adapted to support the normal thrust load but rupturable upon a predetermined thrust overload, a piston member in one of said chambers having an outer end operatively connected to said engine attachment portions and an inner end in contact with said frangible member, and plastically yieldable means in the other of said chambers adapted to be contacted by said piston member upon rupture of the frangible portion and extruded from said other chamber to limit the applied force to a predetermined value.

8. A shock absorber mount for a thrust engine comprising an engine support structure, a first means adapted for absorption of abnormal engine shock energy fixedly positioned on said support structure for yieldably supporting said engine upon application thereto of a thrust force above a predetermined limit; a second means contacting said engine support structure and the engine and securely attaching said engine to the support structure for preventing application of the engine thrust force to said energy absorption means during normal operation when the engine thrust force does not exceed the predetermined limiting value, said second means including a member adjacent said first means rupturable upon application thereto of a thrust force in excess of the predetermined limit for permitting application of the thrust force to said energy absorption means after rupture of said member; and means on said engine support structure in juxtaposition to said yieldable first means for securely holding said yieldable means and said engine at their limit of travel after yielding of said first means.

References Cited in the file of this patent

UNITED STATES PATENTS

| | | |
|---|---|---|
| 994,892 | Tschudy | June 13, 1911 |
| 1,761,973 | Daubner | June 3, 1930 |
| 2,351,427 | Henshaw | June 13, 1944 |